United States Patent Office.

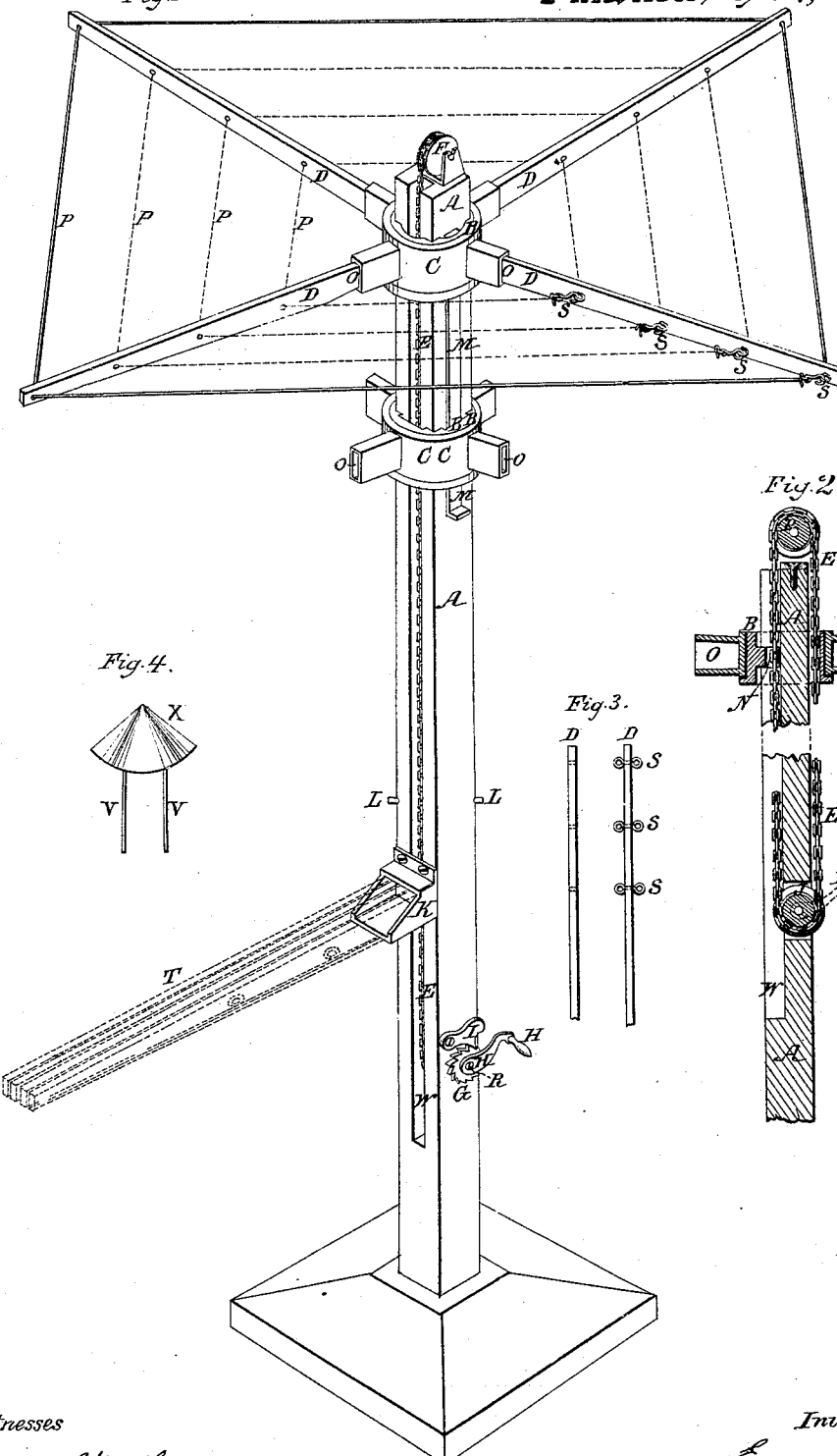

EDWARD CARTER, OF RENSSELAER, NEW YORK.

Letters Patent No. 94,562, dated September 7, 1869.

IMPROVED CLOTHES-DRIER.

The Schedule referred to in these Letters Patent and making part of the same.

Be it known that I, EDWARD CARTER, of the city and county of Rensselaer, and State of New York, have invented a new and useful Improvement on a Machine for Drying Clothes, known as a clothes-reel or drier; and I do declare that the following is a full, clear, and exact description of the construction and operation of the same, reference being had to the annexed drawings, making part of this specification, in which—

Figure 1 is a perspective view.

Figures 2, 3, and 4, sectional elevations.

In fig. 1, a double reel is shown.

A is a post, either round, with groove, square, or other shape, on which the inner hub B can be made to slide up and down without revolving.

E is a chain-rope or belt, attached to the inner hub at N, as shown in fig. 2, and passing up the groove W, over the roller F, down on the other side, as shown in fig. 2, around the sheave-wheel J, on the axle K, to which are attached the ratchet-wheel G, and crank H, and pawl I, and then up the groove W to the upper and inner hub B, to which it is attached, at N.

It will be seen that by turning the crank H, the axle K and wheels G and J are set in motion, carrying with them the chain E, causing the hub B to move up or down the post, in accordance with the motion given to the crank.

C is a revolving hub, resting on and revolving around the inner hub B, in which are sockets or mortises O O, for the arms D D, on which is stretched the line P P, hooked, as shown at S, in order that the arms can be readily taken out with the lines attached, and put under cover when not in use.

B B is another non-revolving hub, as at B, around which is a revolving hub, C C, as at C, for a second reel, similar to the first.

B B slides on the post, as does B, but is not attached to the chain, but is supported by the bars M, that are secured to the hub B.

The bars M M pass loosely through the hub B B, so that when the reels are lowered, B B rests on the stops L L. The bars M pass down till the hub B rests on B B.

K is a metal socket, into which the arms are set, in order to facilitate putting up or taking down.

X is a metal cap or cover, to be fastened to the top of the post A, to roof the working-parts from the weather.

To operate this apparatus, the post must be set up and secured in a perpendicular position, the crank H turned to bring the hub B B to rest on the stops L, and B to rest on B B; then the set of arms, with line for the upper reel put into K, the arm D, with the rings or loops, as in fig. 3, first put into the mortise O, then the other arms in rotation, and the lines hooked, as at S. Put on the clothes, in the usual manner, turn the crank H, and elevate the hub B till the bars M hook under the hub B B. Let down the pawl I into the ratchet G, and construct the second reel in the same manner as the first, and elevate to the top of the post, and when required down, lift the pawl and reverse the motion of the crank, bringing the reels down.

What I claim as my invention, and desire to secure by Letters Patent, is—

1. The endless chain E and the sheave-wheel J, as arranged and constructed, for elevating and lowering the inner or non-revolving hub B, as shown and described.

2. The catch-bars M M, secured to the hub B, for operating the lower reel B B, as shown and described.

Witnesses:  
JAMES S. HAWLEY,  
G. E. T. D. COOK.

EDWARD CARTER.